United States Patent Office 3,156,126
Patented Nov. 10, 1964

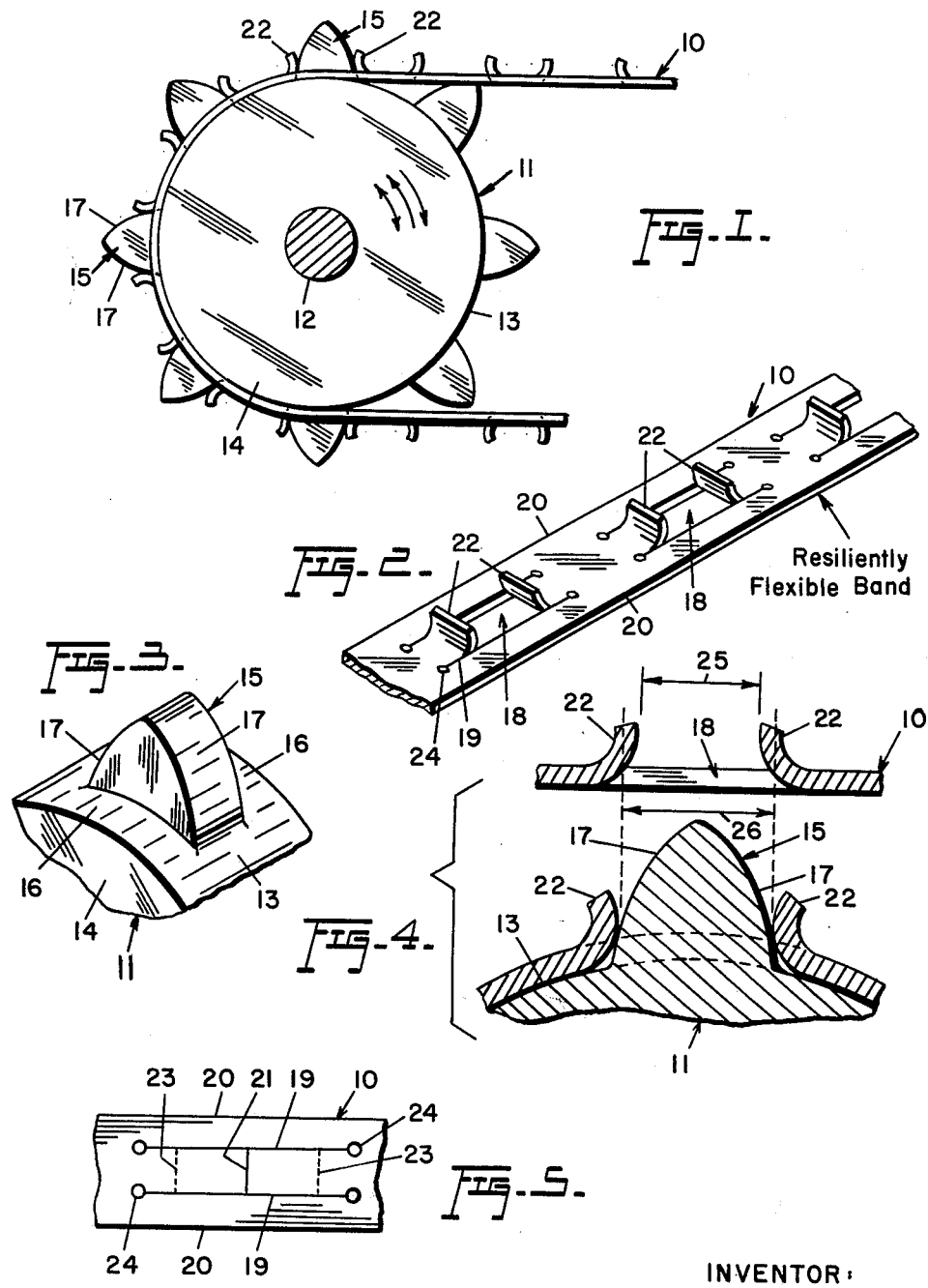

3,156,126
POSITIVE BELT DRIVES
Horace W. Olsen, 2038 North Blvd., Houston 6, Tex., assignor of one-third each to Sol A. Levy, Jr., and Jack W. Gregory, Jr., both of Houston, Tex.
Filed June 1, 1962, Ser. No. 199,535
5 Claims. (Cl. 74—229)

This invention relates to new and useful improvements in belt drives, and the principal object of the invention is to provide a positive mechanical belt drive which may be effectively employed for transmission of force with a high degree of precision and without back lash such as is encountered in conventional chain and sprocket drives.

Briefly, the positive belt drive in accordance with the invention utilizes a sprocket with peripherally spaced teeth, and a resiliently flexible band formed with longitudinally spaced openings for receiving the sprocket teeth. An important feature of the invention involves the provision of resilient fingers at opposite ends of the band openings, which fingers are frictionally engageable with driving edges of the teeth so that slack or backlash is completely eliminated while retaining the inherent shock absorbing qualities of resiliency which are highly desirable in any mechanical drive.

The resilient fingers are formed integrally with the band and the band as such may be easily and economically manufactured by readily available equipment.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a fragmentary elevational view of the positive belt drive in accordance with the invention, illustrating the driving band in engagement with a sprocket;

FIGURE 2 is a fragmentary perspective view of the driving band per se;

FIGURE 3 is a fragmentary perspective view of the sprocket;

FIGURE 4 is a fragmentary sectional view, showing the band prior to and after its engagement with a sprocket tooth; and FIGURE 5 is a fragmentary plan view of the band blank, prior to outturning of its fingers.

Referring now to the accompanying drawings in detail, the positive belt drive in accordance with the invention comprises a driving band 10 which is adapted to engage one, two or more sprockets, one of which is illustrated at 11. The drive may be continuous in either direction, or it may be an oscillating or reciprocating drive wherein the direction of rotation of the sprocket is intermittently reversed.

The sprocket 11, shown as being mounted on a shaft 12, has a peripheral edge 13 and a pair of side faces 14, and the peripheral edge 13 is provided with a set of circumferentially spaced teeth 15 which are spaced axially inwardly from the side faces 14 so as to provide a pair of shoulders 16 at the opposite sides of the teeth. Each of the teeth 15 is radially outwardly tapered and includes a pair of driving edges 17.

The driving band 10 is formed from resiliently flexible material such as spring steel, for example, and is provided with longitudinally spaced openings 18 which are adapted to receive the teeth 15 when the band is engaged with the sprocket 11. As shown in FIGURE 5, each opening is formed by providing a pair of spaced parallel slits 19 in the band, in inwardly spaced relation from the band side edges 20, and a transverse slit 21 is provided between the slits 19, halfway between their ends. Portions of the band between the slits 19 and separated by the slit 21 are pressed out to form a pair of outwardly curved, resilient fingers 22 at the opposite ends of the opening 18 which is formed by the pressing out of the fingers, the outward curvature of the fingers commencing approximately from the bend lines indicated at 23 in FIGURE 5, so that in effect, the end portions of the slits 19 extend longitudinally beyond the bend lines 23 where the curved fingers merge into the flatness of the band blank. Terminal apertures 24 are provided in the band at the ends of the slits 19 to prevent the band from tearing at the ends of the slits. In the process of manufacture, the band blank may first be punched with the slits 19, 21 and apertures 24 and the outward bending of the fingers 22 performed subsequently. Alternatively, the slit and aperture punching and the finger bending may be done in a single operation.

When the band 10 is applied to the sprocket 11, the sprocket teeth 15 are received in and project outwardly through the openings 18 in the band, as will be readily apparent, while the side edge portions of the band engage the shoulders 16 of the sprocket. However, it is to be particularly noted, as illustrated in FIGURE 4, that the distance 25 between each pair of fingers 22, prior to engagement of the associated band portion with the sprocket, is somewhat less than the maximum distance 26 between the driving edges 17 at the root of the tooth 15, so that when the tooth enters the opening 18, the tooth edges 17 come in contact with and are frictionally engaged by the resilient fingers 22, causing the fingers to spread apart in so doing. The difference between the dimensions 25 and 26 in FIGURE 4 is exaggerated for illustrative purposes, but in actual practice it does exist sufficiently to provide for the aforementioned frictional engagement of the resilient fingers with the driving edges of the tooth, yet without binding so that withdrawal of the tooth from the opening 18 is facilitated when the particular band portion with the opening therein passes off the sprocket. It is to be further noted that the frictional engagement of the fingers 22 with the driving edges 17 of the tooth positively eliminates any slack or back lash, but at the same time, the resilient fingers provide effective shock absorbing qualities which are highly deisrable in any mechanical drive.

The accompanying drawings show the band 10 as being provided with one row of the openings 18 and associated fingers 22, to engage one row or set of teeth on the sprocket. However, wider bands and sprocekts may be utilized, using several rows of openings and fingers to engage several rows or sets of sprocket teeth. Moreover, in such multiple arrangements, the band openings may be either transversely aligned or longitudinally staggered, as will be clearly apparent.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a positive belt drive, the combination of a sprocket having a peripheral edge and a pair of side faces, a set of circumferentially spaced teeth provided on said peripheral edge in axially inwardly spaced relation from said side faces, portions of said peripheral edge between said teeth and said side faces forming a pair of shoulders at the opposite sides of the teeth, each of said teeth having a pair of driving edges, a resiliently flexible band engaging said sprocket, the portion of said band intermediate its side edges being formed with longitudinally spaced openings receiving the teeth of said sprocket therein with side edge portions of the band engaging said shoulders, and pairs of resilient fingers provided on said band at opposite ends of said openings, the fingers in each pair having free ends and being spaced apart by a distance smaller than the circumferential dimension of a tooth of said sprocket received in the associated band opening whereby both of said driving edges of the tooth may simultaneously be in frictional engagement with the respective of the pair of fingers.

2. In a positive belt drive the combination of a sprocket having a peripheral edge provided with a set of circumferentially spaced teeth, each of said teeth having a pair of driving edges, a band engaging said sprocket, said band being formed with longitudinally spaced openings receiving the teeth of said sprocket therein, and pairs of resilient fingers provided on said band at opposite ends of said openings, the fingers in each pair having free ends and being spaced apart by a distance smaller than the circumferential dimension of a tooth of said sprocket received in the associated band opening whereby both of said driving edges of the tooth may simultaneously be in frictional engagement with the respective of the pair of fingers.

3. The combination as defined in claim 2 wherein said band is formed from resiliently flexible material and said fingers are formed integrally therewith.

4. The combination as defined in claim 2 wherein said band is provided with pairs of parallel slits spaced inwardly from its side edges and defining side edges of said openings, portions of the band between said slits being transversely cut and curved outwardly to constitute said fingers.

5. The combination as defined in claim 4 wherein said band is provided with terminal apertures at the ends of said slits, said apertures being of a substantially larger diameter than the width of the slits.

References Cited in the file of this patent
UNITED STATES PATENTS

| | | |
|---|---|---|
| 354,849 | Barnes | Dec. 21, 1886 |
| 548,591 | Rau | Oct. 22, 1895 |
| 776,517 | Jones | Dec. 6, 1904 |
| 1,044,451 | Goodnight | Nov. 12, 1912 |
| 2,306,816 | Larson | Dec. 29, 1942 |
| 2,408,666 | Mallard | Oct. 1, 1946 |
| 2,926,944 | Moberg | Mar. 1, 1960 |